United States Patent [19]

Uchiumi

[11] Patent Number: 5,171,993

[45] Date of Patent: Dec. 15, 1992

[54] METHOD OF CORRECTING ERROR ARISING IN CURRENT-IMAGING TUNNELING SPECTROSCOPY

[75] Inventor: Hiroshi Uchiumi, Tokyo, Japan

[73] Assignee: Jeol Ltd., Tokyo, Japan

[21] Appl. No.: 813,906

[22] Filed: Dec. 23, 1991

[30] Foreign Application Priority Data

Dec. 27, 1990 [JP] Japan .................................. 2-407770

[51] Int. Cl.⁵ .......................................... G01N 23/225
[52] U.S. Cl. ....................................................... 250/307
[58] Field of Search ......................................... 250/307

[56] References Cited

U.S. PATENT DOCUMENTS 5,025,153 6/1991 Okada et al. ......................... 250/307

OTHER PUBLICATIONS

"Surface Electronic Structure of Si(111)-7×7) Resolved in Real Space", R. J. Hamers, R. M. Tromp and J. E. Demuth, *Physical Review Letters*, vol. 56, No. 18, May 5, 1986, pp. 1972-1975.

*Primary Examiner*—Jack I. Berman
*Attorney, Agent, or Firm*—Webb, Burden, Ziesenheim & Webb

[57] ABSTRACT

The spacing between the probe tip of a scanning tunneling microscope and a sample is maintained constant. A bias voltage circuit produces a bias voltage that is swept across zero volts. Voltages corresponding to the resulting tunneling currents are detected in synchronism with the sweep of the bias voltage applied to the sample. A control unit takes in the output voltage from a curent-to-voltage converter circuit while the bias voltage is being swept. At this time, an error-correcting means accepts the voltage which is detected when the bias voltage is zero volts. This voltage is taken as an error voltage. After the completion of the collection of data, the error-correcting means subtracts the error voltage from all the collected data to correct the data. Where the bias voltage is swept not across zero volts, the voltage which would be detected when the bias voltage was zero volts is calculated by interpolation or extrapolation. The calculated voltage is taken as an error voltage. This error voltage is subtracted from all the data to correct the data.

4 Claims, 3 Drawing Sheets

METHOD OF CORRECTING ERROR ARISING IN CURRENT-IMAGING TUNNELING SPECTROSCOPY

FIELD OF THE INVENTION

The present invention relates to a scanning tunneling microscope (STM) and, more particularly, to a method of correcting errors arising in current-imaging tunneling spectroscopy (CITS) where the bias voltage applied to a sample is swept while maintaining the spacing between the probe tip of an STM and the sample constant and the resulting tunneling current is detected in synchronism with the sweep of the bias voltage.

BACKGROUND OF THE INVENTION

It is known that a scanning tunneling microscope is an instrument for finding the topography on the surface of a sample. In addition, this microscope is capable of detecting the electronic states of local regions on a sample. This is generally known as current-imaging tunneling spectroscopy (CITS). The operation is first described.

FIG. 2 shows the structure of the control system of a conventional scanning tunneling microscope. FIGS. 3 and 4 show the waveforms of signals produced at various locations in this control system. FIG. 3(a) shows the waveform of a bias voltage applied to a sample 2 by a bias voltage circuit 11. FIG. 3(b) shows the waveform of the output voltage from a current-to-voltage converter circuit 3. FIG. 3(c) shows the waveform of the output voltage produced to a sample-and-hold circuit 8 from a control unit 12. FIG. 3(d) shows the waveforms of timing signals that determine the timing at which the control unit 12 takes in input data. FIGS. 4(a) to 4(d) show similar signal waveforms.

Referring to FIG. 2, when an operator instructs the control system to start a sampling operation through an entry device (not shown), the control unit 12 produces a control signal (FIG. 3(c)) to the sample-and-hold circuit 8 to order it to carry out the sampling operation. Also, the control unit 12 instructs the bias voltage circuit 11 to deliver constant voltages. Further, the control unit 12 produces positional signals to an X-drive device and a Y-drive device, none of which are shown. In FIG. 2, the direction of the height from the sample 2 is taken in the Z-direction. The axes forming the plane perpendicular to the Z-direction are taken as X- and Y-axes.

At this time, the tunneling current flowing through a probe tip 1 is converted into a voltage signal by the converter circuit 3. This voltage signal is changed into a signal of one polarity by an absolute value amplifier 4 and supplied to a logarithmic amplifier 5 whose output signal is a logarithmic function of the input signal. The output signal from the amplifier 5 is applied to a comparator circuit 6 which also receives a reference voltage $V_{ref}$ from the control unit 12. The output signal from the logarithmic amplifier 5 is compared with this reference voltage $V_{ref}$. The phase of the output from the comparator circuit 6 is compensated for by a phase-compensating circuit 7 to prevent oscillation in the feedback loop. The phase-compensated signal from the compensating circuit 7 is fed to a Z-drive circuit 9 via the sample-and-hold circuit 8. A Z-drive device 10 is driven in response to the input signal to the Z-drive circuit 9. The probe tip 1 is moved along the Z-axis until the tunneling current corresponds to the reference voltage $V_{ref}$. At this time, the output voltage from the sample-and-hold circuit 8 is accepted into the control unit 12. This operation is carried out while scanning the XY plane. In this way, the topographical features of the surface of the sample 2 can be imaged.

If a holding operation is then ordered through the entry device (not shown), then the control unit 12 produces a control signal to cause the sample-and-hold circuit 8 to perform a holding operation, thus stopping the movement of the probe tip 1. At the same time, the control unit 12 orders the bias voltage circuit 11 to produce a sweep voltage. The bias voltage circuit 11 produces a bias voltage either of a ramp waveform as indicated by 20 in FIG. 3(a) or of a staircase waveform as indicated by 21 in FIG. 4(a) to the sample 2.

At this time, the control unit 12 takes in the output voltage from the current-to-voltage converter circuit 3 in synchronism with the sweep of the bias voltage and at given timing as shown in FIG. 3(d). The accepted data is processed in a predetermined manner. For example, the rate at which the tunneling current changes with the bias voltage is found. As a result, the electronic states near the probe tip 1 can be known. This method is known as current-imaging tunneling spectroscopy (CITS) and described in the *Physical Review Letters*, Vol. 56, No. 18, pp. 1972–1975, 1986, published by The American Physical Society.

However, when the spectroscopy is conducted, a stray capacitance $C_o$ exists between the probe tip 1 and the sample 2 and so the current varying in response to the sweep bias voltage itself applied to the sample 2 is detected simultaneously. Therefore, an error is introduced in the tunneling current flowing through the probe tip 1. Consequently, an error is introduced in the output voltage from the current-to-voltage converter circuit 3.

SUMMARY OF THE INVENTION

It is an object of the present invention to provide a method which is carried out to correct an error caused by a stray capacitance produced between the probe tip of a scanning tunneling microscope and a sample in current-imaging tunneling spectroscopy and which is capable of obtaining a signal corresponding to the correct tunneling current.

The above object is achieved in accordance with the teachings of the invention by a method of correcting an error produced in current-imaging tunneling spectroscopy. The method is initiated by sweeping the bias voltage applied to a sample while maintaining the distance between the probe tip of a scanning tunneling microscope and the sample constant. Voltages corresponding to the resulting tunneling currents are detected in synchronism with the sweep of the bias voltage.

In one aspect of the invention, the bias voltage is swept across zero volts. The error is found from the voltage detected when the bias voltage is zero volts and from a theoretical output voltage when the bias voltage is zero volts. This error is subtracted from the detected voltage.

In another aspect of the invention, the bias voltage applied to the sample is swept without crossing zero volts while maintaining the distance between the probe tip and the sample constant. Voltages corresponding to the resulting tunneling currents are detected in synchronism with the sweep of the bias voltage. The voltage which would be detected when the bias voltage was zero volts is calculated from the actually detected voltages and taken as an error voltage. This error voltage is subtracted from the actually detected voltages.

In a further aspect of the invention, the bias voltage applied to the sample is swept without crossing zero volts while maintaining the distance between the probe tip and the sample constant. Voltages corresponding to the resulting tunneling currents are detected in synchronism with the sweep of the bias voltage. This sweep is herein referred to as the main sweep. The bias voltage is swept secondarily before or after the main sweep at the same rate as the rate of the main sweep. The voltage detected at zero volts is subtracted from the voltages actually detected in synchronism with the main sweep.

Other objects and features of the invention will appear in the course of the description thereof which follows.

DESCRIPTION OF THE PREFERRED EMBODIMENTS

Figure 1:
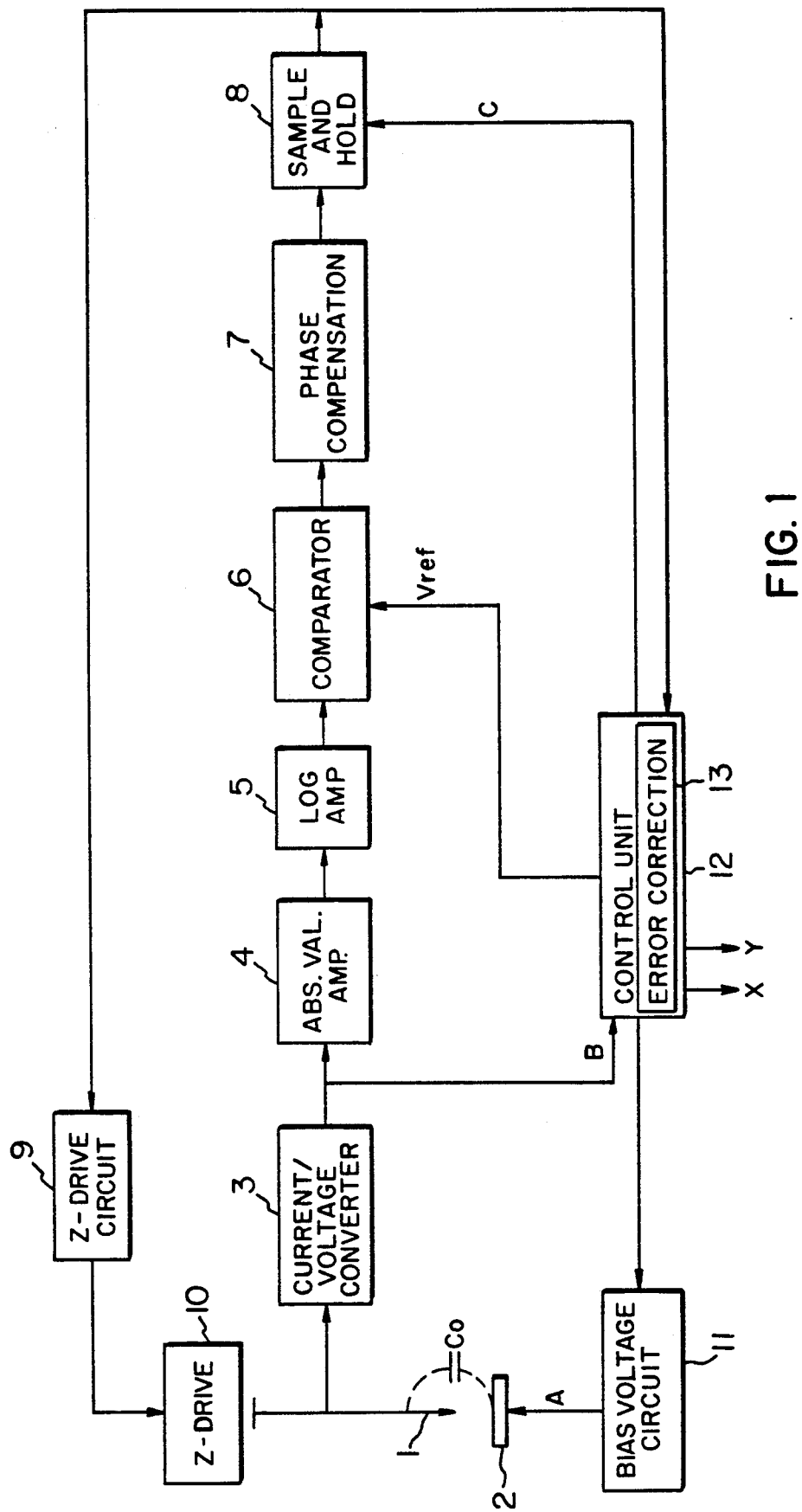
FIG. 1 is a block diagram of a scanning tunneling microscope which corrects errors introduced in current-imaging tunneling microscopy in accordance with the present invention.
Figure 2:
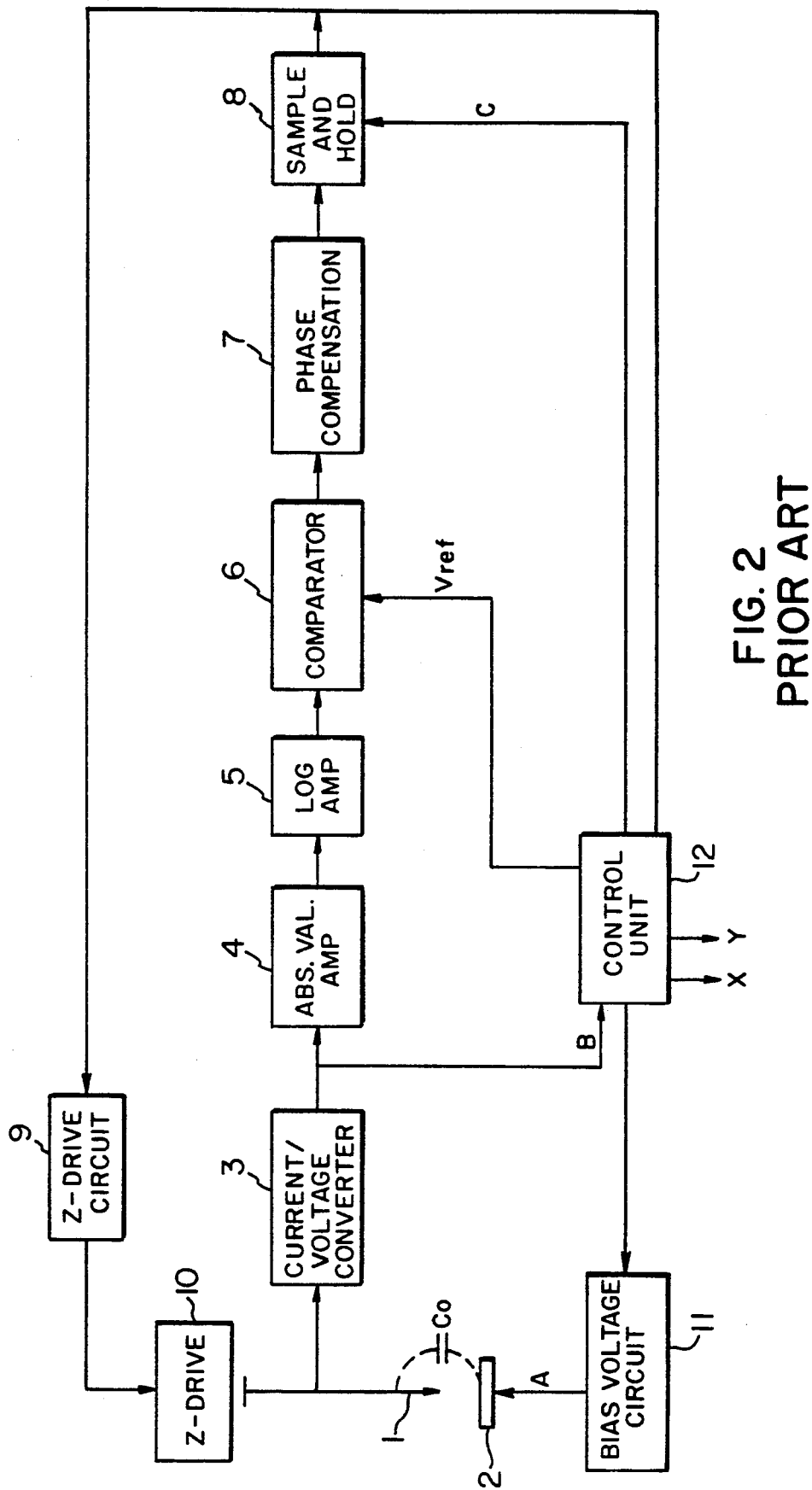
FIG. 2 is a block diagram of a conventional control system incorporated in a scanning tunneling microscope.

Referring to FIG. 1, there is shown a scanning tunneling microscope embodying the concept of the present invention. This microscope is similar in configuration with the instrument shown in FIG. 2 except that an error-correcting means 13 is included in the control unit 12.

Figure 3A:
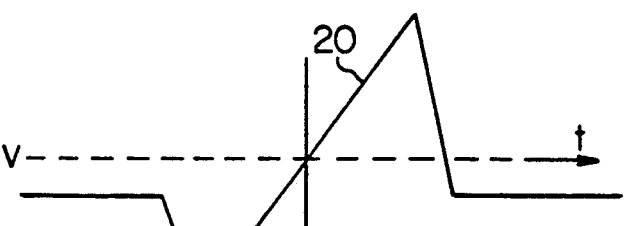
FIGS. 3(a) to 3(d) are diagrams showing various waveforms for illustrating the problems with the conventional spectroscopy and the operation of a scanning tunneling microscope according to the invention.
Figure 4A:
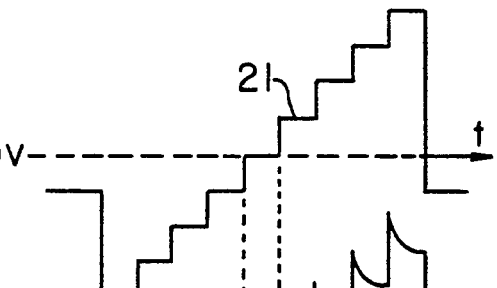
FIGS. 4(a) to 4(d) are diagrams showing various waveforms for illustrating the problems with the conventional spectroscopy and the operation of a scanning tunneling microscope according to the invention.
Figure 4B:
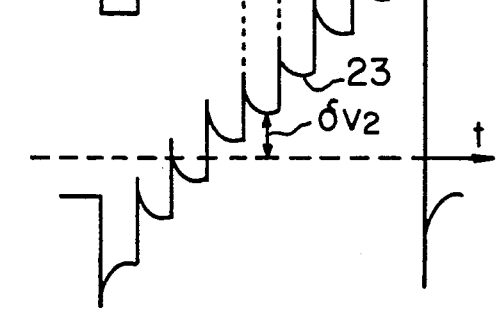
Figure 4C:
Figure 4D:
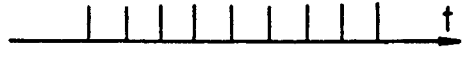

When surface electronic states are imaged by current-imaging tunneling microscopy, the control unit 12 instructs the sample-and-hold circuit 8 to perform a holding operation in the same way as in the conventional method. Also, the control unit 12 causes the bias voltage circuit 11 to produce a sweep bias voltage. As shown in FIGS. 3(a) and 4(a), this bias voltage is swept across zero volts. The control unit 12 takes in the output voltage from the current-to-voltage converter circuit 3 in synchronism with the sweep of the bias voltage and at given timing as described already. At this time, the error-correcting means 13 takes the output voltage produced when the bias voltage was zero volts as an error. After the output voltage has been completely taken into the control unit 12, the error-correcting means 13 subtracts the detected error from all the accepted output voltages to correct the data.

Figure 3B:
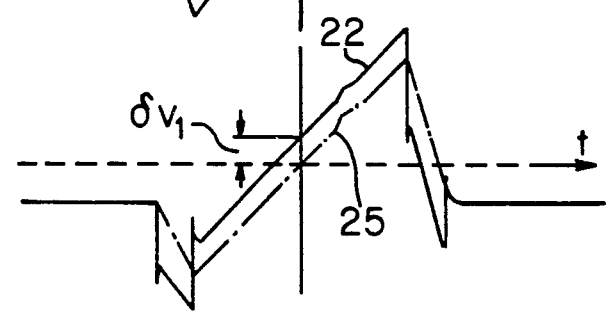
Figure 3C:
Figure 3D:

The reason why the error can be corrected by the above-described operation is now described. The output $V_{out}$ from the current-to-voltage converter circuit 3 is given by $$V_{out} = V_n + V_o \quad (1)$$

where $V_n$ is an error voltage introduced by the sweep bias voltage because of the presence of a stray capacitance and $V_o$ is the detected voltage attributed to the correct tunneling current. Theoretically, if the bias voltage is zero volts, no tunneling current flows. At this time, the theoretical value of the output voltage from the current-to-voltage converter circuit 3 is zero volts. It is assumed that the output voltage from the current-to-voltage converter circuit 3 is $\delta V_1$ as shown in FIG. 3(b) if a ramp wave 20 shown in FIG. 3(a) is applied to the sample 2 and if the sweep bias voltage is zero volts. The error $V_n$ produced at this time is given by equation (1) above. Thus, we have $$\delta V_1 = V_n + 0 \text{ (V)}$$

Therefore, $$V_n = \delta V_1 \quad (2)$$

Because of the stray capacitance between the sample and the probe tip 1 and because of the configuration of the circuit detecting the tunneling current, the error $V_n$ produced due to the sweep bias in detecting the tunneling current is the derivative of the sweep bias. Since the derivative of the ramp wave voltage 20 shown in FIG. 3(a) is a DC component, it follows that a constant error $V_n = \delta V_1$ given by equation (2) is produced within the range of the sweep bias voltage.

Let $V_t$ be the output voltage from the current-to-voltage converter circuit 3 at some instant of time. A value corresponding to the correct tunneling current can be obtained as indicated by the dot-and-dash line 25 in FIG. 3(b) by calculating the difference $V_t - \delta V_1$ and correcting the error due to the stray capacitance $C_o$ between the probe tip 1 and the sample 2.

A similar principle applies where a staircase sweep bias voltage as indicated by 21 in FIG. 4(a) is used as the sweep bias voltage. In particular, the output voltage $\delta V_2$ produced when the bias voltage is zero volts is subtracted from all the output voltages from the detector. In this case, however, data about the output from the detector is not taken in until a given time elapses after the bias voltage varies because the derivative of the voltage is an exponential function provided that the step bias voltages are uniform in width and because the value of the exponential function is constant after a given time has passed from the onset of each step voltage.

Where the bias voltage is swept not across zero volts, any one of the following two methods is carried out. In one method, the voltage which would be detected at 0 bias voltage is calculated by interpolation or extrapolation and taken as an error voltage. This error voltage is subtracted from the output voltage from the detector. In the other method, the bias voltage is secondarily swept across zero volts before or after an actual measurement at the same velocity as that of the main sweep of the bias voltage done in the actual measurement. The output voltage from the detector produced when the bias voltage is 0 is subtracted from the output voltages obtained using the main sweep.

While preferred embodiments of the invention have been described, the present invention is not limited to them. Rather, various changes and modifications are possible. For example, in the above embodiments, data is sampled by the current-to-voltage converter circuit 3. Obviously, the output from the logarithmic amplifier 5 may be sampled instead.

Further, in the above embodiments, the bias voltage is applied to the sample. However, the bias voltage may be applied to the probe tips instead.

In accordance with the present invention, data about the correct tunneling current can be obtained by correcting the error caused by the stray capacitance between the probe tip and the sample in current-imaging tunneling spectroscopy.

Having thus described my invention with the detail and particularity required by the Patent Laws, what is claimed and desired to be protected by Letters Patent is set forth in the following claims.

WHAT IS CLAIMED IS:

1. A method of correcting an error produced in conducting current-imaging tunneling spectroscopy, comprising the steps of:
   applying a bias voltage between a probe tip and a sample while maintaining the distance between the probe tip of a scanning tunneling microscope and the sample constant;
   sweeping the bias voltage;
   detecting first signals indicative of the resulting tunneling currents in synchronism with the sweep of the bias voltage;
   determining a second signal indicative of the tunneling current for a given bias voltage; and
   subtracting said second signal from said first signals signals indicative of the tunneling currents.

2. A method of correcting an error produced in conducting current-imaging tunneling spectroscopy, comprising the steps of:
   applying a bias voltage between a probe tip and a sample while maintaining the distance between the probe tip of a scanning tunneling microscope and the sample constant;
   sweeping the bias voltage across zero volts;
   detecting voltages corresponding to the resulting tunneling currents in synchronism with the sweep of the bias voltage; and
   subtracting the voltage detected when the bias voltage is zero volts from the voltages corresponding to the tunneling currents.

3. A method of correcting an error produced in conducting current-imaging tunneling spectroscopy, comprising the steps of:
   applying a bias voltage between a probe tip and a sample while maintaining the distance between the probe tip of a scanning tunneling microscope and the sample constant;
   sweeping the bias voltage without crossing zero volts;
   detecting voltages corresponding to the resulting tunneling currents in synchronism with the sweep of the bias voltage;
   calculating the voltage which would be detected when the bias voltage was zero volts, from the voltages detected in the previous step;
   taking the calculated voltage as an error voltage; and
   subtracting the error voltage from the detected voltages corresponding to the tunneling currents.

4. A method of correcting an error produced in conducting current-imaging tunneling spectroscopy, comprising the steps of:
   applying a bias voltage between a probe tip and a sample while maintaining the distance between the probe tip of a scanning tunneling microscope and the sample constant;
   sweeping the bias voltage without crossing zero volts;
   detecting voltages corresponding to the resulting tunneling currents in synchronism with the sweep of the bias voltage;
   sweeping the bias voltage at the same velocity as that of the first-mentioned sweep before or after the first-mentioned sweep;
   finding the voltage which would be detected when the sweep voltage was zero volts, from the voltages detected in the last-mentioned sweep; and
   subtracting the found voltage from said voltages corresponding to the tunneling currents.

* * * * *